UNITED STATES PATENT OFFICE.

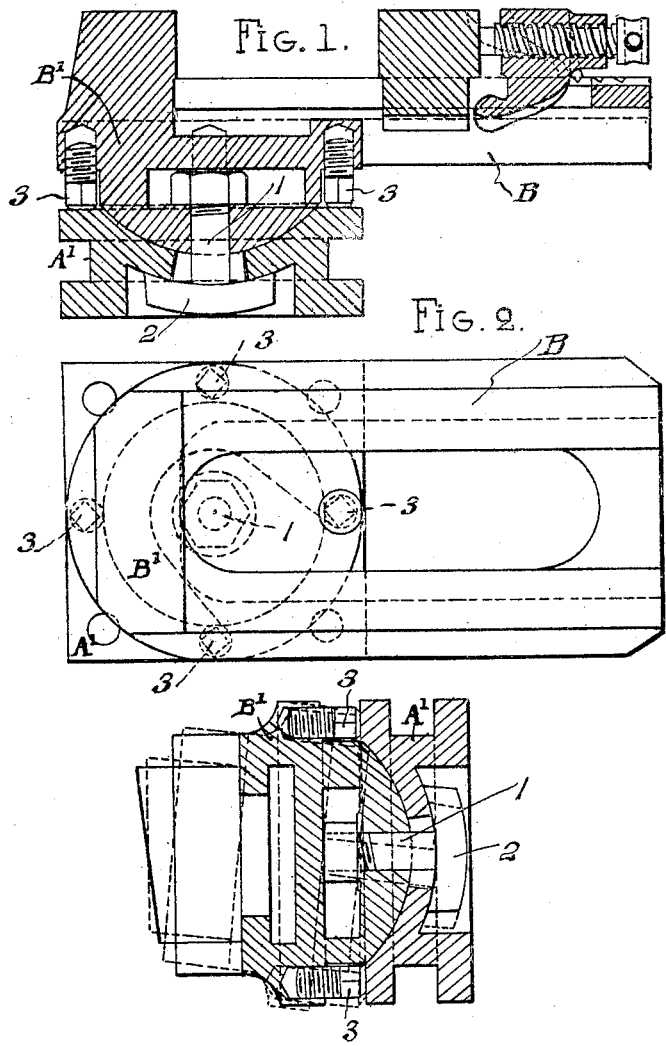

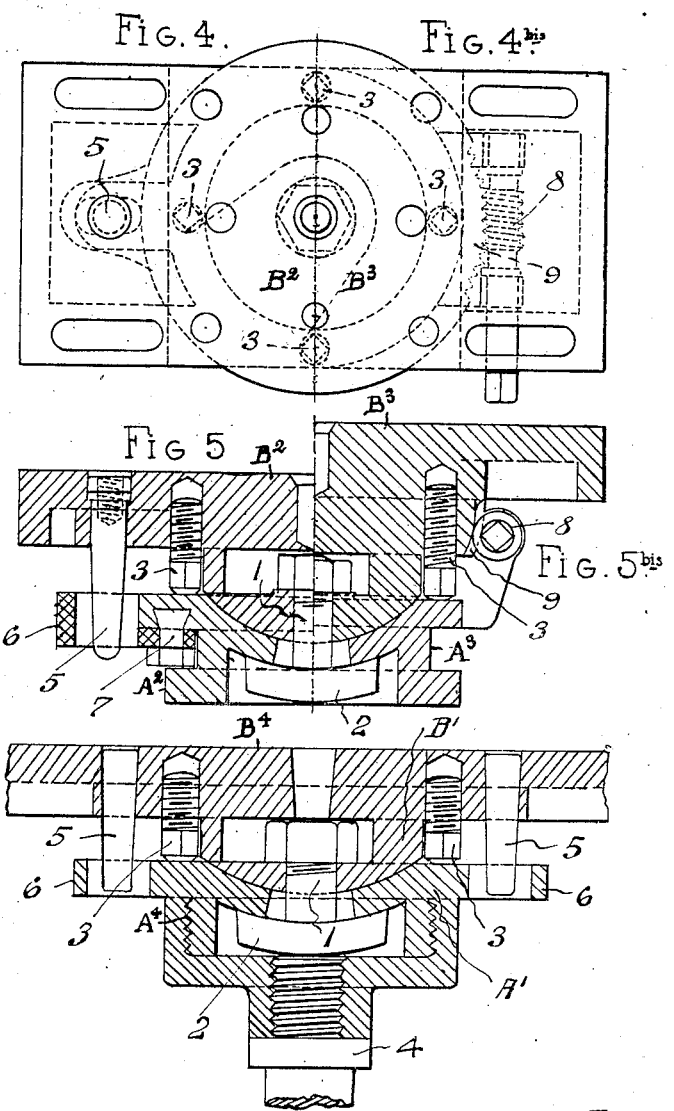

FRANÇOIS-LOUIS BRODU, OF NANTES, FRANCE.

ADJUSTABLE WORK-HOLDER FOR MACHINE-TOOLS AND THE LIKE.

1,380,287.　　　Specification of Letters Patent.　　Patented May 31, 1921.

Application filed December 9, 1919. Serial No. 343,682.

*To all whom it may concern:*

Be it known that FRANÇOIS-LOUIS BRODU, of 27 Boulevard Babin-Chevaye, Nantes, France, a citizen of the French Republic, (whose post-office address is 27 Boulevard Babin-Chevaye, Nantes, France,) has invented certain new and useful Improvements in Adjustable Work-Holders for Machine-Tools and the like, of which the following is a specification.

This invention provides an improved work holder for machine tools of all kinds, the distinguishing feature of which is its universal adjustability which enables the leveling or centering of the work held therein to be quickly and accurately effected.

It is applicable to all kinds of machine-tools such as shaping machines, planing machines, drilling machines, lathes, etc., and in general to any machine furnished with a plate or table serving to receive and maintain the pieces of metal or other material which it is desired to shape precisely thereon.

It may be made of cast iron or cast steel, in any size and proportion.

This improved work holder is illustrated in the accompanying drawings wherein:

Figure 1 is a longitudinal sectional view through the work holder.

Fig. 2 is a top plan view thereof.

Fig. 3 is a transverse sectional view through the work holder.

Figs. 4 and 4$^{bis}$ show in top plan a modified application of the invention.

Figs. 5 and 5$^{bis}$ show the structure of Figs. 4 and 4$^{bis}$ in longitudinal section.

Fig. 6 shows in section another modified application of the invention.

The work holder under consideration consists essentially of two principal parts, the first or fixed part A$^1$ (Figs. 1, 2 and 3) which is bolted on to the bed or table of the machine tool and the second or adjustable part B' (Figs. 1, 2 and 3) which is adjustable on the base.

This second part B has on its under face a convex spherical surface which rests in the concave spherical cavity of equal curvature formed in the upper part of the first part A$^1$. A central bolt 1 having a wide circular head 2 with spherical concentric faces is set in a square hole in the part B$^1$, the head of the bolt engaging the under face of the part A$^1$. This bolt together with the adjusting screws 3, holds the part B$^1$ firmly in any adjusted position.

The adjusting screws are four in number. They are arranged diametrically opposite one another and placed on the lines of two perpendicular diameters. They are screwed into the body of the movable part B and make contact with the smooth upper surface of the fixed part A$^1$, which surface forms a crown or rim externally to the spherical surfaces.

The work of constructing the different parts of the apparatus having been suitably performed the two pieces when put together thus provide 1st, a firm seating; 2nd a perfect fitting; 3rd a turning pivot; 4th a universal adjustment in all directions.

The adjusting screws serve as their name implies for moving the adjustable part B$^1$ of the device into and securing it firmly in any position required according to the other shape or configuration of the piece of work to be operated upon.

The adjustable part is provided with or made in one with 1st: either a vise B with a sliding jaw of any kind—(Figs. 1, 2 and 3) or 2nd: with a platform B$^2$ or table B$^3$ (Figs. 4 and 4$^{bis}$, 5 and 5$^{bis}$); or finally with a face-plate B$^4$ (Fig. 6).

Thus we have either a vise with sliding jaw or a clamping platform or a face-plate, one or the other according to requirements, firmly connected with the adjustable part B$^1$ of the apparatus and consequently itself adjustable and consequently also the piece to be shaped that is fixed above is adjustable and is variable in relation to the fixed part A$^1$ which is bolted on to the machine tool or, in the case of a face-plate is screwed on to the head of the lathe mandrel 4 in the same way as a face plate (see Fig. 6).

The method to be followed in employing the apparatus is very simple as can be easily seen.

It consists in the following:

The adjustable part of the apparatus having been put into the mean or central position which can be indicated by a deep circular mark formed on the spherical face B precisely on a level with the smooth surface of the part A, thus being parallel to the plane of the table of the machine tool, the piece to be worked should be tightly clamped approximately in the required position; this position may then be verified by the ordinary known means (rule, square or surface gage) and if there be any need for adjustment, the central bolt should be loosened, the adjusting screw slackened on the side where the work is to be lowered, and the work then brought gradually to the precise position by means of the adjusting screw on the opposite side, the other screws should be brought into slight contact and the central bolt slightly tightened, the position of the work tested again and if necessary, the screws caused to act as before, the central bolt should then be tightly screwed up and a firm contact of the adjusting screws with the surface of the fixed part A assured. The operation is then complete.

Fig. 3 shows in dotted lines the principal lines of the profile of the movable part B¹ placed obliquely.

In order to overcome any tendency of the adjustable part B turning on the fixed part or base owing to the action of the cutting tool, a bolt 5 consisting of a cylindro-conical pin is placed in a hole in the adjustable part and entering a hole in a lug 6 which may be movable and secured in place by a bolt 7, the pin acting as a stop to hold the adjustable part in any position whether straight or oblique. The same result may likewise be obtained by means of an independent stop fixed on the machine.

The apparatus may also be employed for circularly shaping any piece of work whatever fixed concentrically on the adjustable platform.

The central bolt 1 having been unscrewed slightly all that is required is to cause this platform to turn on its central bolt between the successive strokes of the tool, either by means of a lever or by means of a worm 8 and worm wheel 9 (Figs. 4$^{bis}$ and 5$^{bis}$). This latter arrangement obviates the necessity of the pin-bolt, the endless screw performing the same part.

The application of this work holder to a face-plate will be of service in many ways for example:

To retouch or reface a piece of work exactly following the plane or the axis of a part already worked.

To face the surfaces of pieces of work having little material to be removed.

To turn pieces of work which present in the clamps of the face plate a part that is oblique in relation to the axis or plane to be followed, either for some necessary reason or in consequence of a defect in the piece of work. Fig. 6 shows the apparatus applied to the face plate of a lathe.

This drawing (Fig. 6) may be taken as typical of the apparatus intended for a lathe the face plate of which would not exceed 20 centimeters in diameter.

I claim:

1. An adjustable work holder for machine tools comprising a base adapted to be secured to a machine tool and having a spherical concave surface, a platform adapted to receive the work to be operated upon and having a spherical convex surface, a bolt holding the base and the platform together with their spherical faces in contact, and a plurality of adjusting screws for the purpose of supporting the platform in any adjusted position.

2. An adjustable work holder for machine tools comprising a base adapted to be secured to a machine tool and having a spherical concave surface, a platform adapted to receive the work to be operated upon and having a spherical convex surface, a bolt having an enlarged head with concentric spherical faces engaging a spherical face on the underside of the base, said bolt holding the base and the platform together with their spherical faces in contact, a plurality of adjusting screws for the purpose of supporting the platform in any adjusted position, and a pin bolt secured to the platform and entering a hole in a collar adjustably secured to the base for the purpose of preventing any unintentional turning of the platform in relation to the base.

In testimony whereof he has affixed his signature, in presence of two witnesses.

FRANÇOIS-LOUIS BRODU.

Witnesses:
   GEORGE M. STUDLEY,
   GERMAIN HIPPOLYTE.